Feb. 16, 1937. J. L. MATTHEWS ET AL Re. 20,270

SPLINE SHAFT

Original Filed March 2, 1935 2 Sheets-Sheet 1

INVENTORS
Joseph L. Matthews and
Aage C. C. Hansen,
BY Hoguet, Harry & Campbell,
Their ATTORNEYS

SPLINE SHAFT

Original Filed March 2, 1935 2 Sheets-Sheet 2

INVENTORS
*Joseph L. Matthews and*
*Aage C. C. Hansen,*
BY *Hoeguet, Neary & Campbell,*
*Their* ATTORNEYS Reissued Feb. 16, 1937 Re. 20,270

UNITED STATES PATENT OFFICE 20,270

SPLINE SHAFT

Joseph L. Matthews, Highland Park, and Aage C. C. Hansen, Lindeneau, N. J., assignors to International Motor Company, New York, N. Y., a corporation of Delaware Original No. 2,015,430, dated September 24, 1935, Serial No. 9,002, March 2, 1935. Application for reissue April 18, 1936, Serial No. 75,246

3 Claims. (Cl. 64—1)

The present invention relates to spline shafts and methods of manufacturing the same and embodies, more specifically, an improved spline shaft and method of manufacturing wherein the splines are formed by fluting in a particular manner. In the specific construction shown and described herein, the tooth form is that of an involute tooth.

Considerable difficulty has been experienced with spline shafts for motor vehicle systems in that the provision of splines in a shaft substantially reduces the strength thereof and increases damage due to breakage thereof. It has been found that the torsional strength of a spline shaft is not much greater than that of the root diameter of the spline. If it is desired to have failure occur outside of the spline end of a shaft, it is necessary to make the root diameter of the splines slightly larger than the body diameter of the shaft. Even under such conditions, when in actual service in motor vehicles, shafts of this character frequently fail in the spline section, producing a fracture which frequently results in great damage to other parts of the mechanism in which the spline is mounted.

It has been found that these failures always start in the comparatively sharp corners at the root of the splines, the impact strength of the section at the sharp corners or small fillets being greatly impaired due to stress concentration at these points.

To avoid failures of the above character, the present invention proposes to provide a fluted spline construction wherein the stress concentration at the bottom of the spline is at a minimum. With this object in view the present invention seeks to provide a spline of maximum strength, the base of which is as broad as possible. In combination with such spline, the present invention proposes to provide a large fillet at the bottom of the spline, the fillet having a continuous radius of maximum size to avoid stress concentration which has been so fatal in present constructions.

An object of the invention, accordingly, is to provide an improved fluted spline construction having maximum strength for a given size of shaft and spline.

A further object of the invention is to provide a fluted spline profile by means of which bending stresses on the spline are avoided.

A further object of the invention is to provide a method by means of which fluted spline teeth of an improved character are hobbed in such fashion that the teeth are formed with rounded fillets of large radius of curvature and with a comparatively thick base and large pressure angle.

Further objects, not specifically enumerated above, will be apparent as the invention is described in greater detail in connection with the accompanying drawings, wherein.

Figure 1:
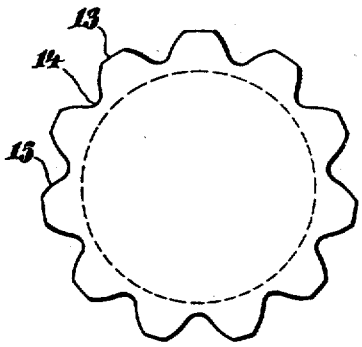
Figure 1 is a view in end elevation showing a spline shaft formed in accordance with the present invention.
Figure 2:
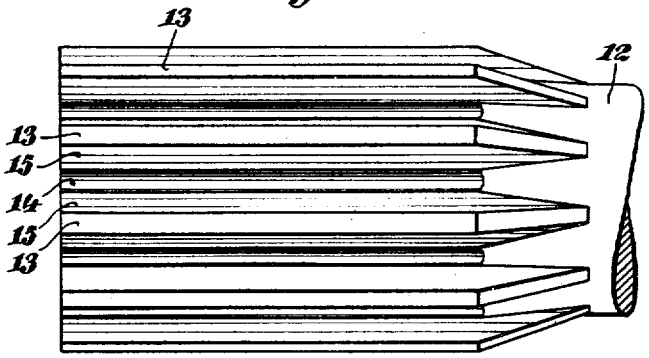
Figure 2 is a view in side elevation of the spline end of a shaft as shown in Figure 1.

Referring to the above drawings and as noted above, it is proposed, in accordance with the present invention, to form involute splines having relatively thick bases, a large pressure angle and a large radius of curvature in the fillets. Such a spline construction is illustrated in Figures 1 and 2 wherein a fluted spline shaft 12 is provided with involute spline teeth 13 having fillets 14 of a large radius of curvature, the pressure angle of the surfaces 15 of the splines being relatively large.

Figure 3:
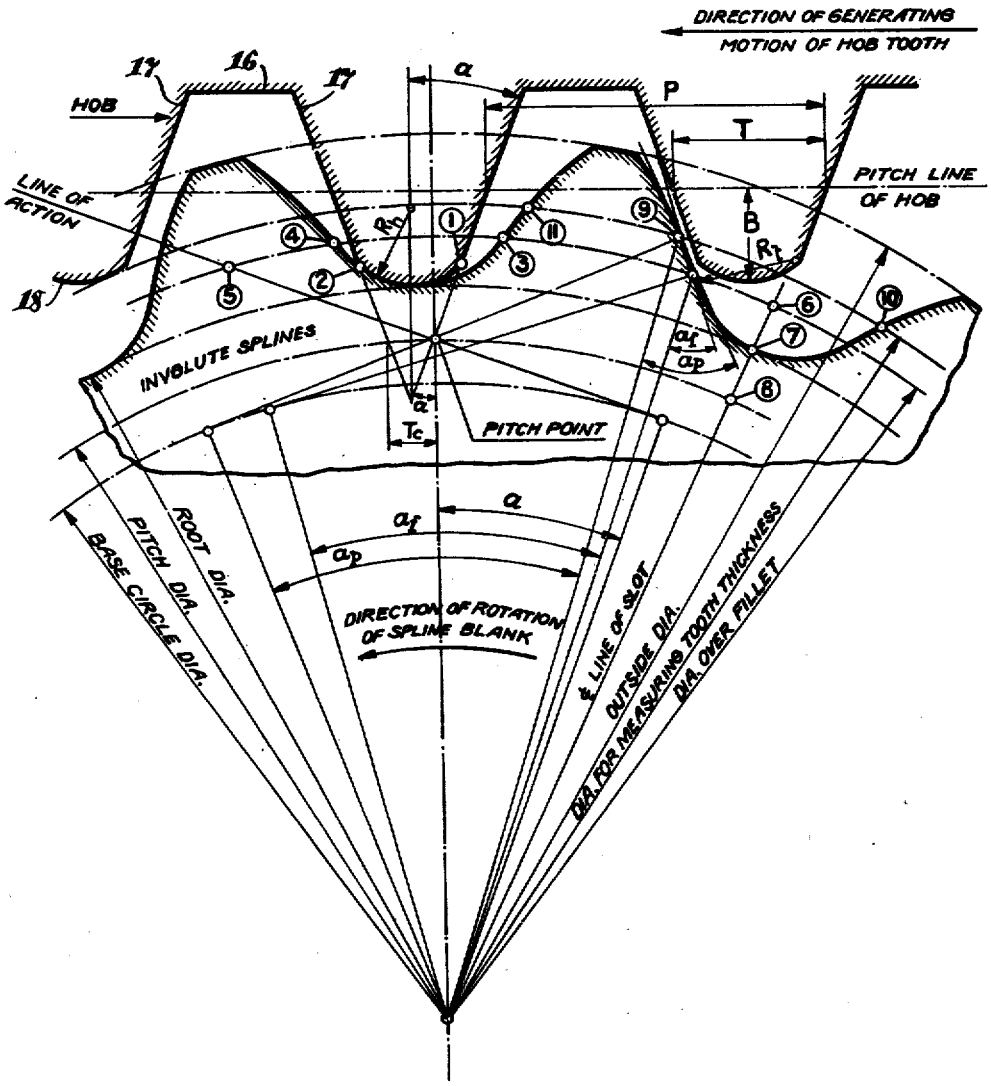
Figure 3 is a diagrammatic illustration of the manner in which the spline teeth of Figure 1 are hobbed.

With reference to Figure 3, a hob 16 is shown as being formed with teeth 17, the top lands 18 of which are rounded upon a radius $R_h$. The teeth of hob 16 are shown in the process of generating the teeth of the spline shaft. The hob is formed with a pressure angle of $\alpha$, a pitch of P, and a tooth thickness of T at an addendum of B. The generating motion of the hob is coordinated with the rotation of a pitch circle of the splines that is conceivably inside of the spline tooth root circle. This will be apparent from conceiving the pitch line of the hob moving with a linear velocity equal to the peripheral speed of the pitch diameter of the spline. In this fashion, the pitch point is entirely inside of the spline teeth, and an imaginary extension of the tooth of the hob will produce an imaginary hob tooth thickness of $T_c$ at the pitch circle.

It will be seen that the spline tooth profile consists of two curves, an involute curve generated off the base circle and extending from the top land to the diameter over the fillet, and the curve of the fillet which extends from the diameter over the fillet to the root of the tooth. It will be seen that the involute portion of the spline tooth profile is generated by the straight sided portion of the hob tooth, whereas, the rounded fillet of the spline tooth is generated by the top land of the tooth of the hob.

As illustrated in Figure 3, the teeth which are hobbed will be formed with a rounded fillet of large radius of curvature, a thick base of the spline teeth and a large pressure angle. The round of the top land of a hob tooth shown as formed upon a radius $R_h$, will reproduce itself in the generating process into a round of the fillet as shown by the radius $R_t$. Furthermore, the thickness of the base of the spline teeth is dependent upon the size of the radius $R_t$. The larger the radius $R_t$, the thicker will become the base of the teeth. The size of the radius $R_t$ increases as the ratio of the distance between 3 and 4 to the distance between 6 and 7 increases and the size of the ratio of the distance between 3 and 4 to the distance between 6 and 7 increases as the pressure angle $a_t$ at the diameter over the fillet is increased. The size of the pressure angle $a_t$ increases as the distance between points 7 and 8 is increased or as the hob pressure angle $a$ is increased. The pressure angle $a_p$ taken at the diameter for measuring the tooth thickness at the mid-portion of the tooth contact, is subjected to an increase when the pressure angle $a_t$ is increased. It is also important that the angle between the sides of two adjoining splines be such that the extension of the component of the driving force normal to the face of the tooth at any point of the active part of the involute tooth part intersects the portion of the root circumference of the spline shaft beneath such tooth. Where the tooth structure is such that these normal forces pass above or outside of the profile of the spline, there results a bending action of the tooth which tends to tear out the spline at the base of the tooth. This stress tends to split the spline shaft and thus is a very objectionable and deleterious stress. This stress practically does not exist in applicants' structure, inasmuch as a solid and extended section of metal lies behind the tooth in the direction of such line of action and thus affords a very strong and stress-resisting structure.

From the foregoing, it will be seen that when splines are hobbed with a large distance between points 7 and 8 or a large hob pressure angle $a$ and a rounded top land on the hob teeth the generating action will produce a large rounded fillet, a thick base and large pressure angle on the spline teeth. It is to be noted that the larger the distance between points 7 and 8 or the larger the hob pressure angle $a$ the greater will become the distance between 1, 2 and 5 and consequently the greater the height between points 6 and 7 of the rounded fillet. A large distance between points 7 and 8 or a large hob pressure angle $a$ also causes a large ratio between the distance of the arc 9—10 and 9—11 unless hob tooth thickness "$t$" is made smaller than space between hob teeth. Proper designing will not permit the distance between points 6 and 7 to become too large, thus permitting the rounded fillet to encroach upon the tooth contact surface. Furthermore, the arc 9—10 should not become much larger than the arc 9—11 and cause the internal tooth to become much stronger than the external tooth. It should also be noted that the distance between points 7 and 8 or the hob pressure angle $a$ cannot be increased beyond the point where the thickness $T_c$ of the hob tooth decreases to zero.

Figure 4:
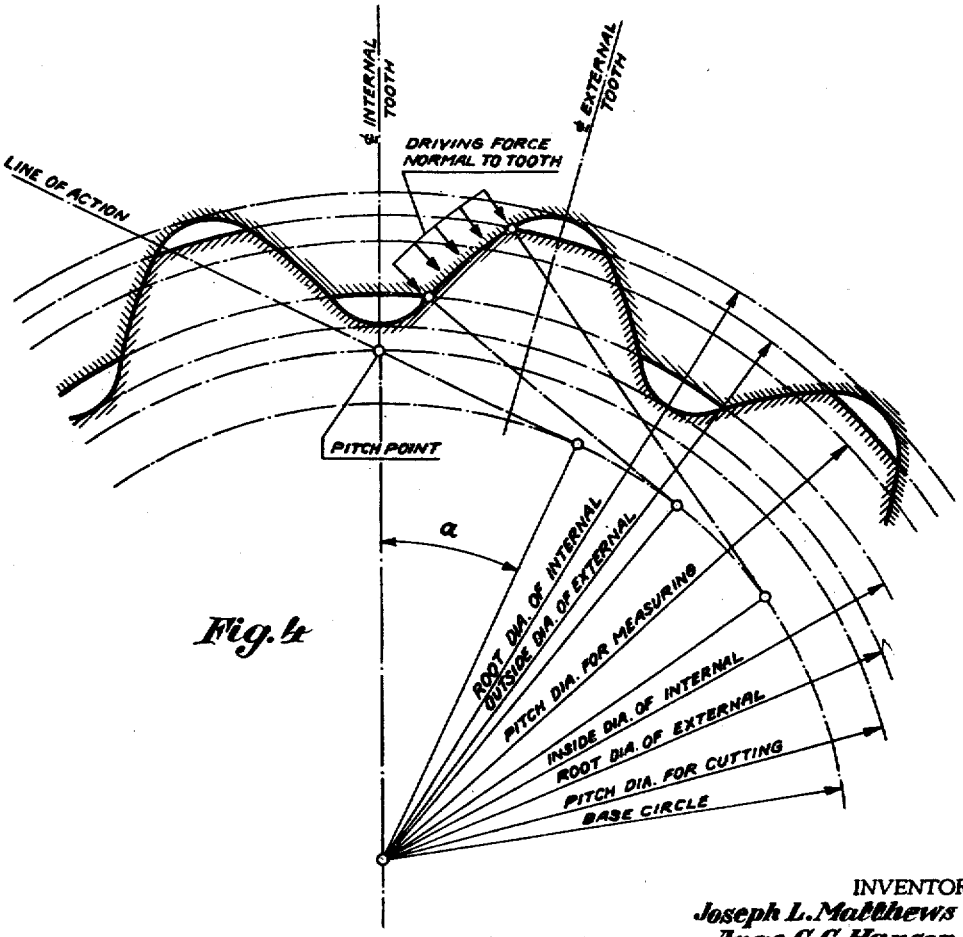
Figure 4 is a view showing the relation of the spline teeth to forces exerted thereon normal to the tooth profile.

Figure 4 illustrates the manner in which the spline teeth take driving forces which are normal to the tooth profile. It will be seen that the teeth are so formed that the line of these forces passes under the fillet, thus being taken by the teeth under compression and shear and without setting up any bending stresses in the teeth.

As an illustration of one specific shaft constructed in accordance with the foregoing, the following proportions exist:

1. The number of splines is 11.
2. The base circle diameter is D.
3. The outside diameter of the spline taken at a pressure angle of approximately 44°17½′ is approximately 1.40×D.
4. The mean pitch diameter at the mid point of contact, taken at a pressure angle of approximately 40° is approximately 1.31×D.
5. The diameter over the fillet taken at a pressure angle of approximately 34°31½′ is approximately 1.21×D.
6. The fillet is substantially a circular arc, the radius of curvature of which is approximately .07×D.
7. The root diameter, or the diameter under the fillet is approximately 1.16×D.
8. The circular tooth thickness at a pressure angle of 40° is approximately .18×D minus a substantial amount of backlash.

From the foregoing it will be seen that a spline has been provided of a maximum strength and answering the requirements of severe service in motor vehicle operation.

While the invention has been described with specific reference to the accompanying drawings, it is not to be limited, save as defined in the appended claims.

We claim:

1. A shaft having involute spline teeth formed thereon and full circular rounded fillets between the teeth, the angle between the sides of two adjoining splines being relatively large and variable, the surfaces of the fillets at the points at which the fillets merge with the involute surfaces being tangent with the said involute surfaces, and the tooth contour being such that the extension of the component of the driving force normal to the face of the tooth at any point of the active part of the involute tooth part intersects the portion of the foot circumference of the spline shaft beneath such tooth.

2. A shaft having fluted spline teeth formed thereon, the fluted spline teeth forming grooves of such character that the surface between two adjacent high points upon opposite sides of a groove lies below a straight line drawn between these high points, the angle between the sides of two adjoining splines being relatively large, the contour of the teeth being such that extensions of the component of the driving force normal to the face of the tooth at any point of the active part of the tooth part intersects the portion of the root circumference of the spline shaft beneath such tooth.

3. A shaft having fluted curved spline teeth formed thereon, the angle between the sides of two adjacent splines being relatively large and variable, the contour of the teeth being such that extensions of the component of the driving force normal to the face of the tooth at any point of the active part of the tooth part intersects the portion of the root circumference of the spline shaft beneath such tooth.

JOSEPH L. MATTHEWS.
AAGE C. C. HANSEN.

CERTIFICATE OF CORRECTION.

Reissue No. 20,270. February 16, 1937.

JOSEPH L. MATTHEWS, ET AL.

It is hereby certified that error appears in the printed specification of the above numbered patent requiring correction as follows: Page 2, second column, line 49, claim 1, for the word "foot" read root; and that the said Letters Patent should be read with this correction therein that the same may conform to the record of the case in the Patent Office.

Signed and sealed this 23rd day of March, A. D. 1937.

(Seal)

Henry Van Arsdale
Acting Commissioner of Patents.